(12) United States Patent
Gardner

(10) Patent No.: US 11,229,200 B1
(45) Date of Patent: Jan. 25, 2022

(54) ADJUSTABLE TREE STAND

(71) Applicant: Christopher Norman Gardner, Navarre, FL (US)

(72) Inventor: Christopher Norman Gardner, Navarre, FL (US)

( * ) Notice: Subject to any disclaimer, the term of this patent is extended or adjusted under 35 U.S.C. 154(b) by 235 days.

(21) Appl. No.: 16/372,862

(22) Filed: Apr. 2, 2019

(51) Int. Cl.
*A01M 31/02* (2006.01)

(52) U.S. Cl.
CPC .................................. *A01M 31/02* (2013.01)

(58) Field of Classification Search
CPC ..................................................... A01M 31/02
See application file for complete search history.

(56) References Cited

U.S. PATENT DOCUMENTS

| | | | | |
|---|---|---|---|---|
| 4,022,292 A * | 5/1977 | Van Gompel | ......... | A01M 31/02 182/33 |
| 5,848,666 A * | 12/1998 | Woodall | ..................... | A45F 3/26 182/187 |
| 6,571,916 B1 * | 6/2003 | Swanson | ................ | A01M 31/02 108/152 |
| 7,926,775 B1 * | 4/2011 | Milazzo | ................ | A01M 31/02 248/230.8 |
| 8,230,972 B2 * | 7/2012 | Johnson | ................ | A01M 31/02 182/187 |
| 8,522,920 B1 * | 9/2013 | Salyer | ................... | A01M 31/02 182/188 |
| 8,708,592 B1 * | 4/2014 | Gardner | ................ | A01M 31/02 403/53 |
| 9,938,734 B1 * | 4/2018 | Garis | ...................... | E04G 5/067 |
| 10,524,467 B1 * | 1/2020 | Garis | .................... | A01M 31/02 |
| 2008/0169156 A1 * | 7/2008 | Leishman | ............. | A01M 31/02 182/187 |
| 2010/0300808 A1 * | 12/2010 | Hale | ..................... | A01M 31/02 182/187 |
| 2011/0226553 A1 * | 9/2011 | Ekes, II | ................ | A01M 31/02 182/188 |
| 2014/0339020 A1 * | 11/2014 | Bradley | ................ | A01M 31/02 182/187 |

\* cited by examiner

*Primary Examiner* — Alvin C Chin-Shue
(74) *Attorney, Agent, or Firm* — Peter Loffler

(57) ABSTRACT

An adjustable tree stand has a housing in which a wheel rotates. The housing is strapped or otherwise secured to a tree in the usual way. The wheel has a first extension that protrudes from the housing and has a female receiver. A frame has a second extension with a downwardly directed male pin. The second extension sits atop the first extension with the pin received within the receiver to thereby connect the frame to the housing, Rotation of the wheel rotates the frame. A locking mechanism prevents the wheel from rotating when not desired. A threaded bolt passes through the frame and engages the housing in order to pivot the housing with respect to the frame. Appropriate platforms are attached to the frame.

18 Claims, 6 Drawing Sheets

ADJUSTABLE TREE STAND

BACKGROUND OF THE INVENTION

1. Field of the Invention

The present invention relates to a tree stand frame that attaches to a rotational adjustment mechanism itself attached to a tree. The rotational adjustment mechanism allows roll leveling of the tree stand while a pitch adjustment subsystem located on the frame and interacting with the rotational adjustment mechanism also allows pitch adjustment. As such, the frame allows the tree stand to be leveled by a user on two different axis, both left and right and back and forth with respect to the tree.

2. Background of the Prior Art

Tree stands are very useful in the sport of hunting. Being located up in a tree, a tree stand elevates a hunter, allowing him or her to see over intervening brush and vegetation that might otherwise block the hunter's view of approaching game. This gives the hunter a better vantage point from which to prosecute the hunt.

As the name strongly implies and excluding box stands and tripod stands, tree stands are located up in and attached to a tree. The tree is selected as is the desired height within the tree to place the stand and the hunter installs the stand. While most hunters are quite adept at installing various tree stands, modern tree stand installation is not without its drawbacks. Chief among the drawbacks is the fact that very few trees grow perfectly straight. As such, in order to be both safe and comfortable on the tree stand, the hunter must level the tree stand prior to use. This can get quite problematic as the hunter may be twenty to thirty feet or more up in the tree while attempting to adjust the securement cables or metal brackets that secure the stand to the tree, all while making sure the hunter does not fall.

To address this problem, various leveling systems have been proposed to help a hunter level the tree stand. Such devices, which come in various architectures and work with varying degrees of efficiency, suffer from drawbacks of their own. Many prior art leveling systems are complex in both design and construction so as to make such devices expensive to manufacture, obtain, and maintain. Some devices are unusually difficult to use, especially when up in a tree. Still others require tools, sometimes specialized tools, adding to the load the hunter must carry during the hunt.

What is needed is a device that allows a hunter to level a tree stand that overcomes the above stated shortcomings found in the art. Specifically, such a device must allow a hunter, working high up in a tree, to be able easily adjust the tree stand in short order without the need for specialized tools. Such a device must be relatively simple in design and construction so that it is relatively inexpensive to produce as well as to maintain.

SUMMARY OF THE INVENTION

The adjustable tree stand of the present invention continues to address issues with leveling a tree stand by a hunter that I first addressed in my U.S. Pat. No. 8,708,592, issued on Apr. 29, 2014, and which is incorporated herein by reference in its entirety. The adjustable tree stand of the present invention is a simple device that allows a single hunter to install and adjust the tree stand very quickly and without tools. Once the tree stand is adjusted as desired, the configuration is locked in for a stable platform from which to work off of. The adjustable tree stand is of very simple design, being produced using stand manufacturing techniques, so as to make the device relatively inexpensive and economically attractive to potential consumers for this type of device.

The adjustable tree stand of the present invention is comprised of a frame that has a first end and a second end. The frame also has a first extension, the first extension having a downwardly directed connector pin. A housing has a rotation wheel rotatably disposed therein. The rotation wheel has a second extension that protrudes outwardly from a central opening in the housing such that the second extension rotates in lock-step with rotation of the rotation wheel.

The second extension has an upwardly facing connector opening. The rotation wheel has an outer circumference. A threaded bolt passes through frame, this bolt being a part of the pitch adjustment subsystem. The housing is secured to a trunk of a tree and the frame is positioned so that the first extension is seated atop the second extension and the connector pin is received within the connector opening thereby connecting the frame to the housing. Rotation of the rotation wheel causes rotation of the second extension, which causes rotation of the first extension that is connected to the second extension via the connector pin-connector opening joinder, thereby causing rotation of the frame. The frame pivots with respect to the housing at the connector pin-connector opening junction so that rotation of the threaded bolt abuts against a bottom of the housing causing such pivot. A locking mechanism is attached to the housing such that the locking mechanism articulates between an unlocked position wherein the rotation wheel is free to rotate within the housing and a locked position wherein the rotation wheel is prevented from rotating within the housing. This locking mechanism is comprised of at least one pin opening disposed on the outer circumference of the rotation wheel and a lock pin that passes through the housing such that when the lock pin is received within the pin opening on the rotation wheel, the rotation wheel is prevented from rotating within the housing. The lock pin is spring-loaded to allow it to be lifted out of its pin opening, rotate the rotation wheel, and then have the spring bias the lock pin back into the pin opening the lock pin is then aligned with. A second locking mechanism is attached to the frame such that this locking mechanism articulates between an unlocked position wherein the connector pin is removable from the connector opening and a locked position wherein the connector pin cannot be removed from the connector opening. The housing has a series of teeth extending from a back thereof, the teeth designed to dig into the tree when the housing is secured to the trunk. A first platform may be attached to the first end of the frame while a second platform may be attached to the second end of the frame. The first platform is a seat and the second platform is a standing pad.

BRIEF DESCRIPTION OF THE DRAWINGS

Similar reference numerals refer to similar parts throughout the several views of the drawings.

DESCRIPTION OF THE PREFERRED EMBODIMENT

Figure 1:
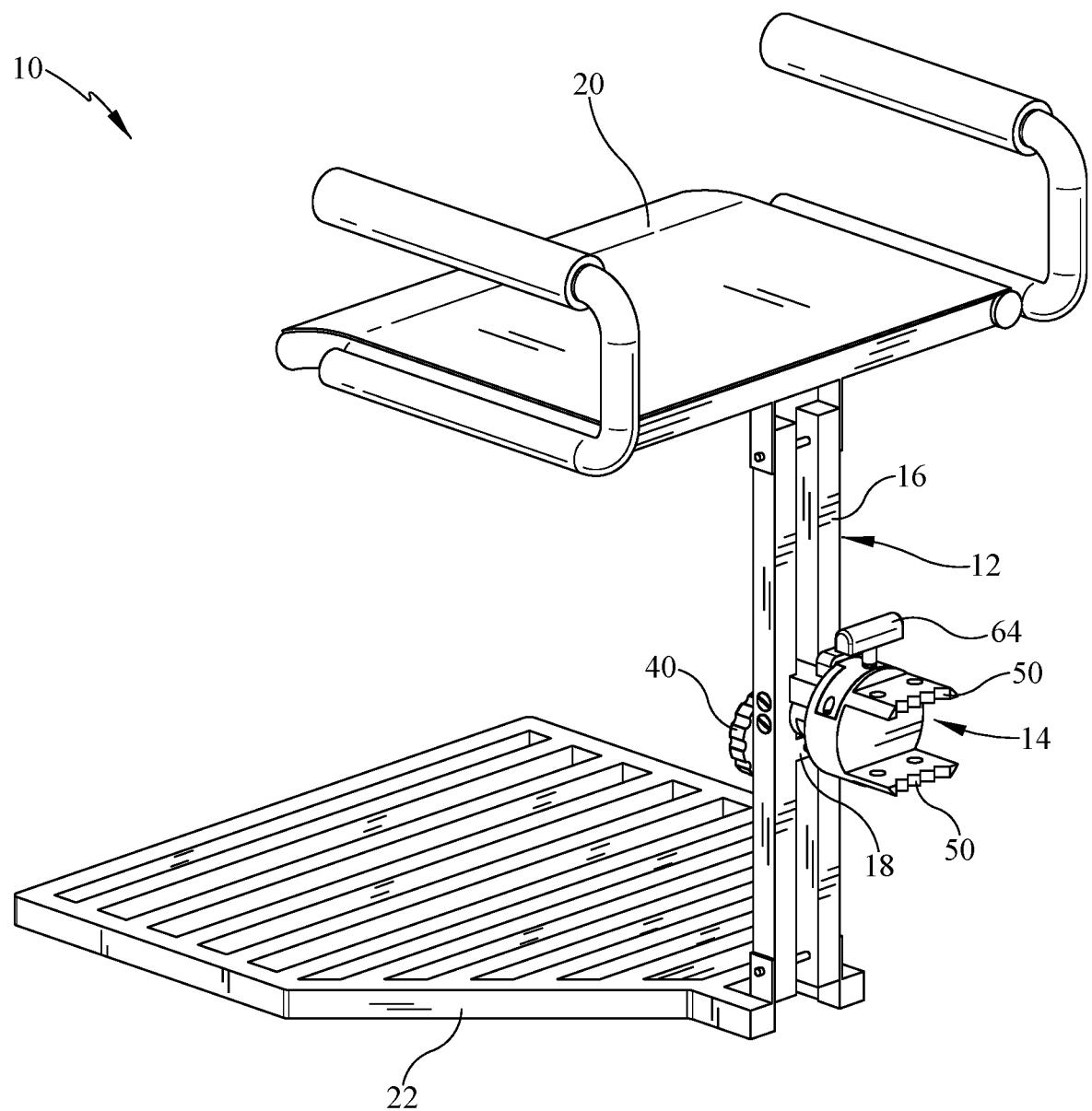
FIG. 1 is an upper perspective view of the adjustable tree stand of the present invention.
Figure 2:
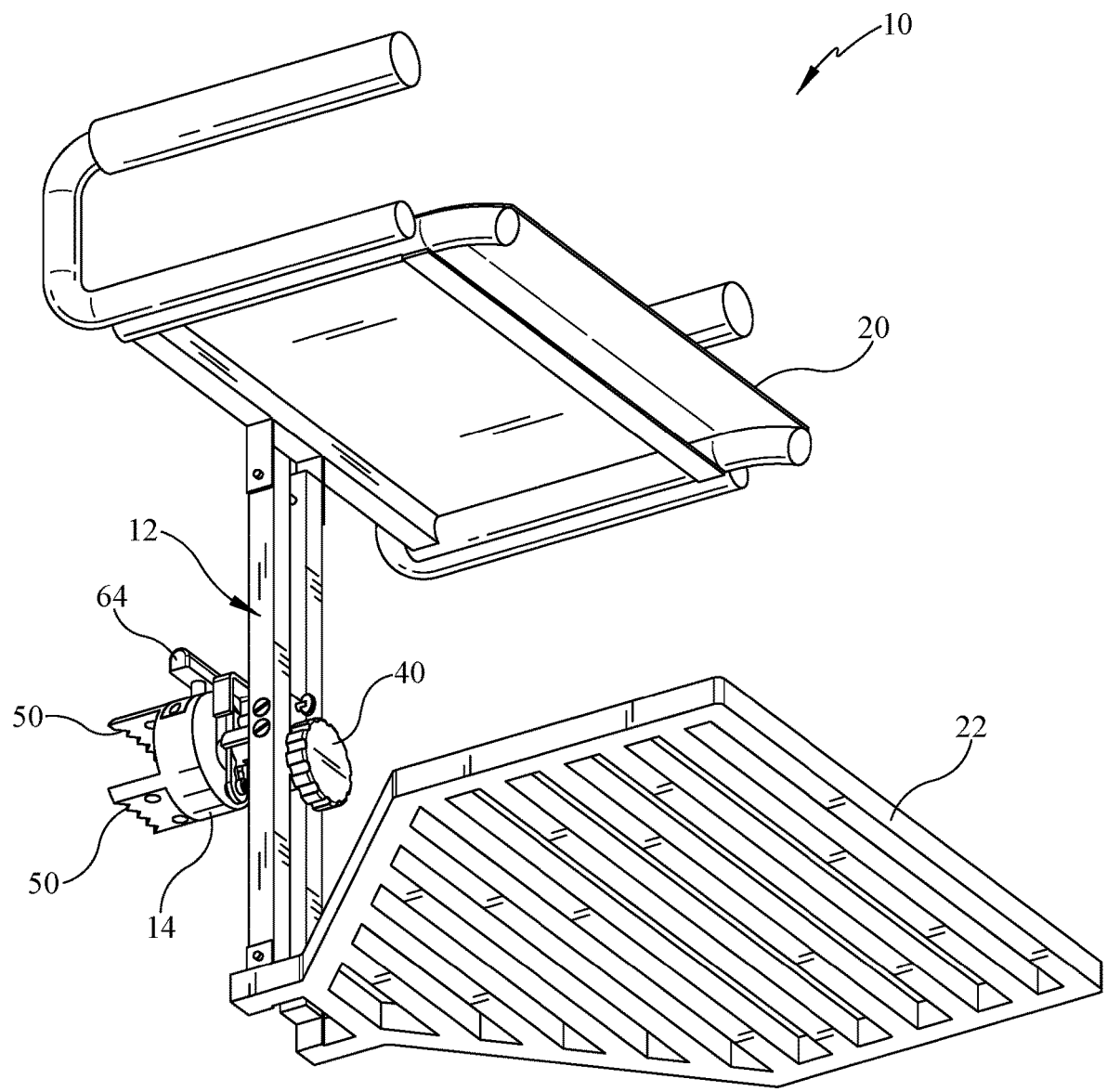
FIG. 2 is a lower perspective view of the adjustable tree stand.
Figure 3:
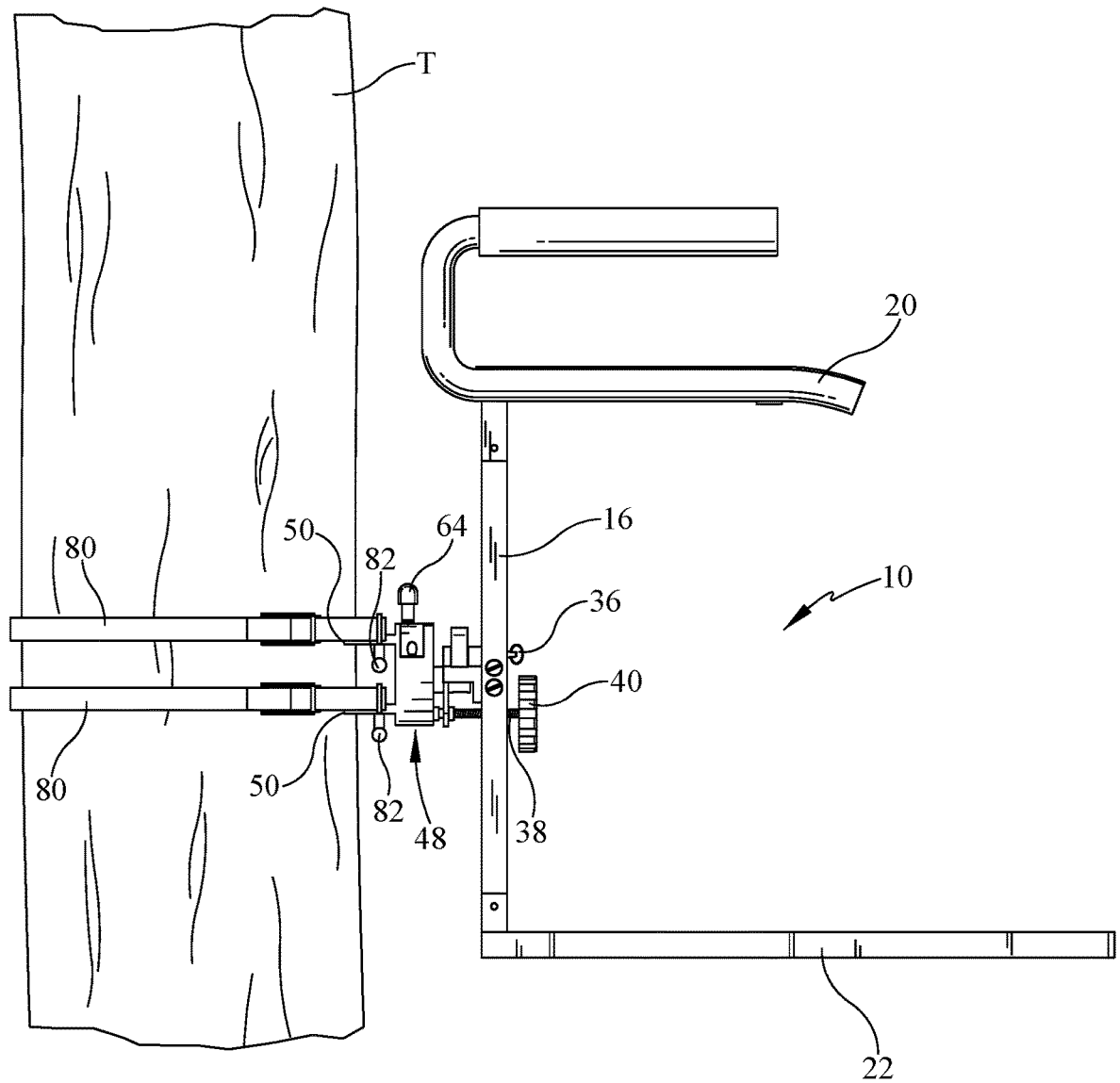
FIG. 3 is a side view of the adjustable tree stand attached to a tree.

Referring now to the drawings, it is seen that the adjustable tree stand of the present invention, generally denoted by reference numeral 10, is comprised of two major components, the frame system 12 and the rotational adjustment mechanism 14 to which the frame system 12 removably attaches.

As seen, the frame system 12 is comprised of a pair of main rails 16, joined by one or more cross rails 18, the main rails 16 have a seat 20 attached at an upper end thereof and a standing pad 22 at a lower end thereof each by appropriate pins 24. The seat 20 and the standing pad 22 may each be adjustable as desired. While the seat 20 and the standing pad 22 can each be fixedly attached to the main rails 16, by having these components detachable makes the adjustable tree stand 10 compact in size for transportation and storage. A rail extension 26 is attached to the main rails 16 just above a cross rail 18, the attachment being in any appropriate fashion such as via the illustrated screws 28. Extending downwardly from the rail extension 26 is a connector pin 30. An optional locking system that uses the illustrated tumbler 32 that is attached to the rail extension 26 that operates via a key 34 and the locking latch 36 that turns in lock-step with articulation of the tumbler 32. The locking system is explained more fully below.

A pitch adjustment mechanism has a threaded bolt 38 that passes through a cross rail 16. A rotation knob 40 rotates the threaded bolt 38. Located on the distal end of the threaded bolt 38 is an end cap 42 that has a channel 44 therein. A U-shaped stabilizer 46 extends downwardly from a distal of the rail extension 26 so that the channel 44 of the end cap 42 of the threaded bolt 38 is seated within the inside bottom of the stabilizer 46.

The rotational adjustment mechanism 14 is comprised of a housing 48 that has one or more sets of teeth 50 extending outwardly from a back thereof. A rotation wheel 52 is rotatably disposed within the housing 48 and has a groove 54 located along its outer circumference. Bearings 56 are disposed below the rotation wheel 52 to allow for smooth rotation of the rotation wheel 52 as the groove 54 of the rotation wheel 52 rides along the bearings 56 when the rotation wheel 52 rotates within the housing 48 as more fully explained below. As seen, a series of pin openings 58 is located on the outer circumference of the rotation wheel 52. Once the rotation wheel 52 is within the housing 48, a cap 60 is secured to the opening of the housing 48 in appropriate fashion. A locking mechanism is attached to the cap 60. As seen, the locking mechanism is comprised of a lock pin 62 that slidably protrudes through the cap 60 and has a handle 64 on the end thereof. As seen, the lock pin 62 is spring loaded via the illustrated spring 66 that is disposed within the cap 60. The lock pin 62 is seated within one of the pin openings 58 located on the rotation wheel 52 and prevents rotation of the rotation wheel 52 due to the locking mechanism's spring-loaded nature.

Figure 4A:
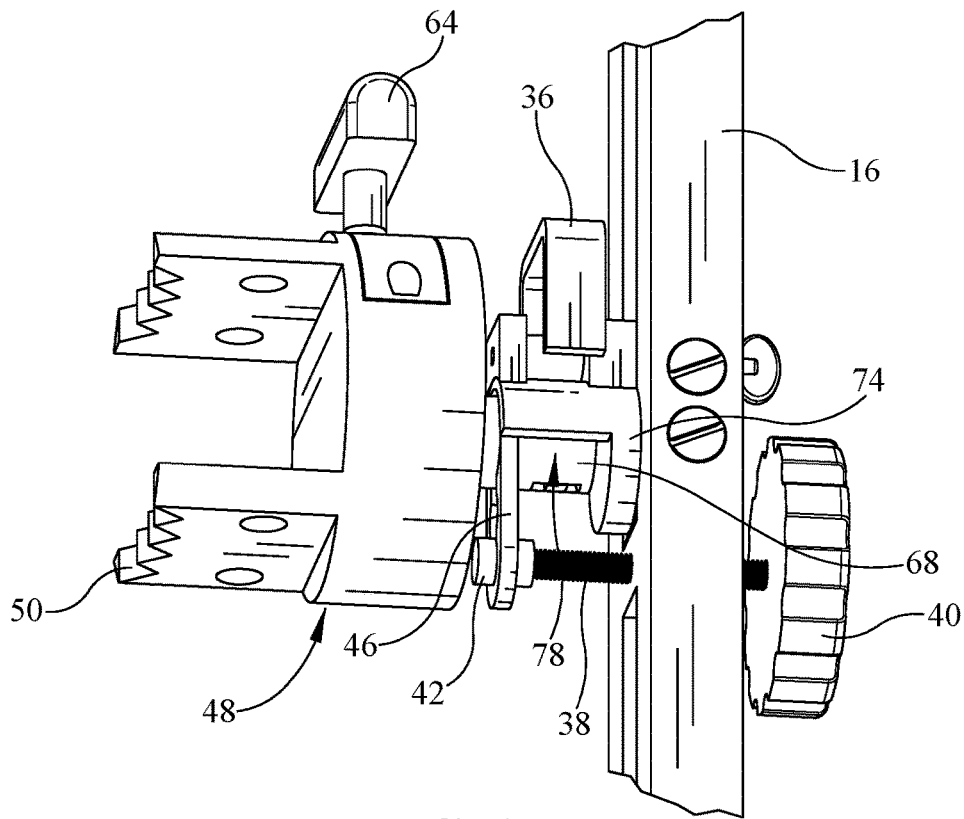
FIGS. 4A and 4B illustrate the locking mechanism of the adjustable tree stand.
Figure 4B:
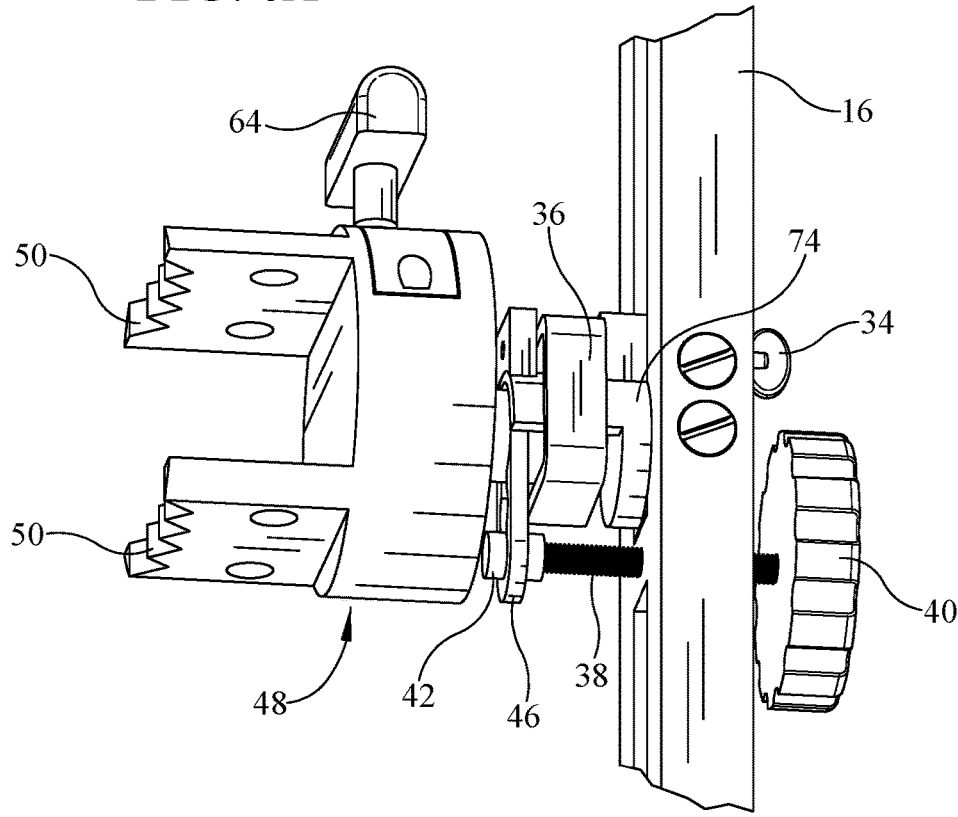
Figure 5:
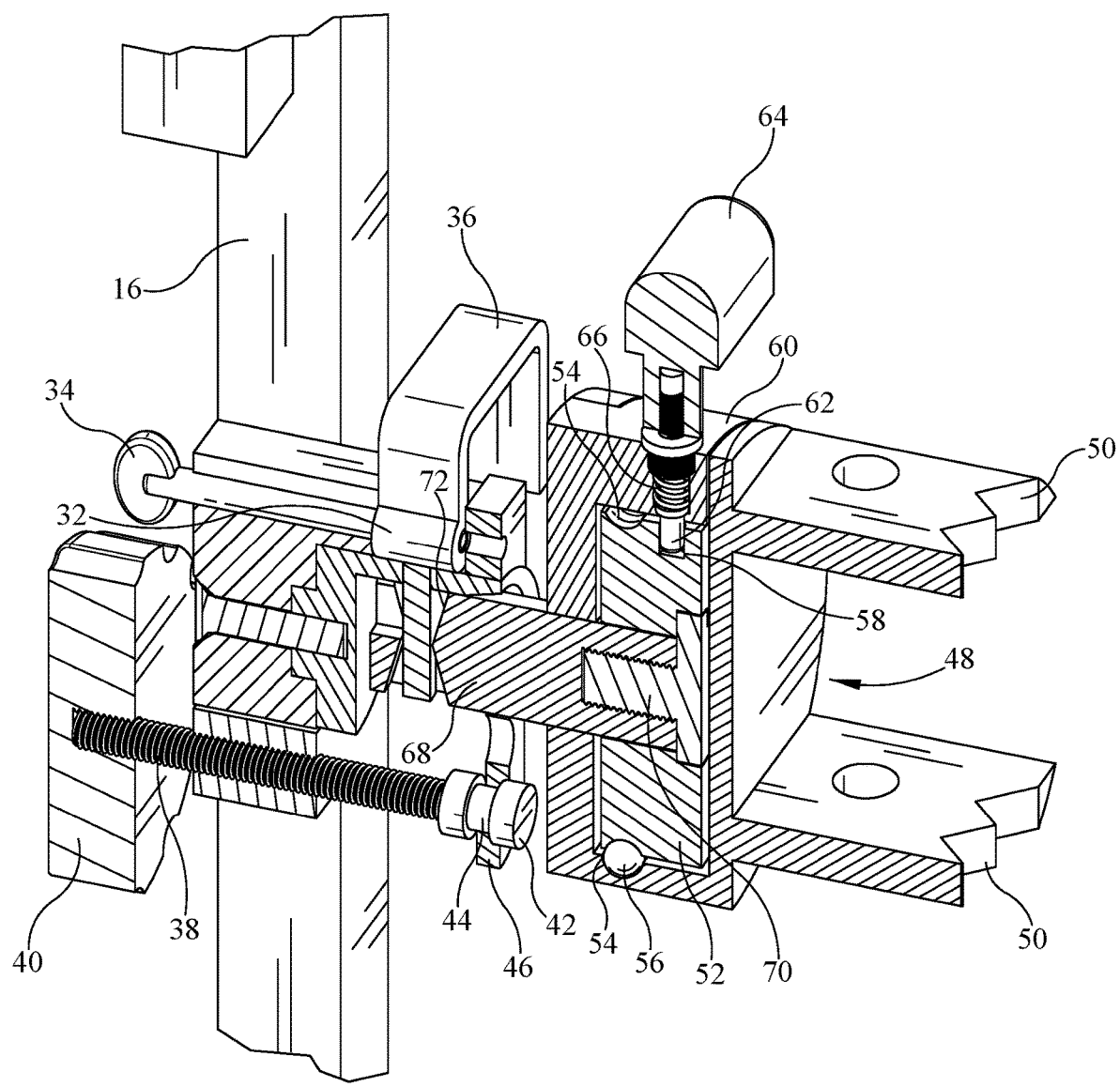
FIG. 5 is a sectioned view of the major components of the adjustable tree stand.
Figure 6:
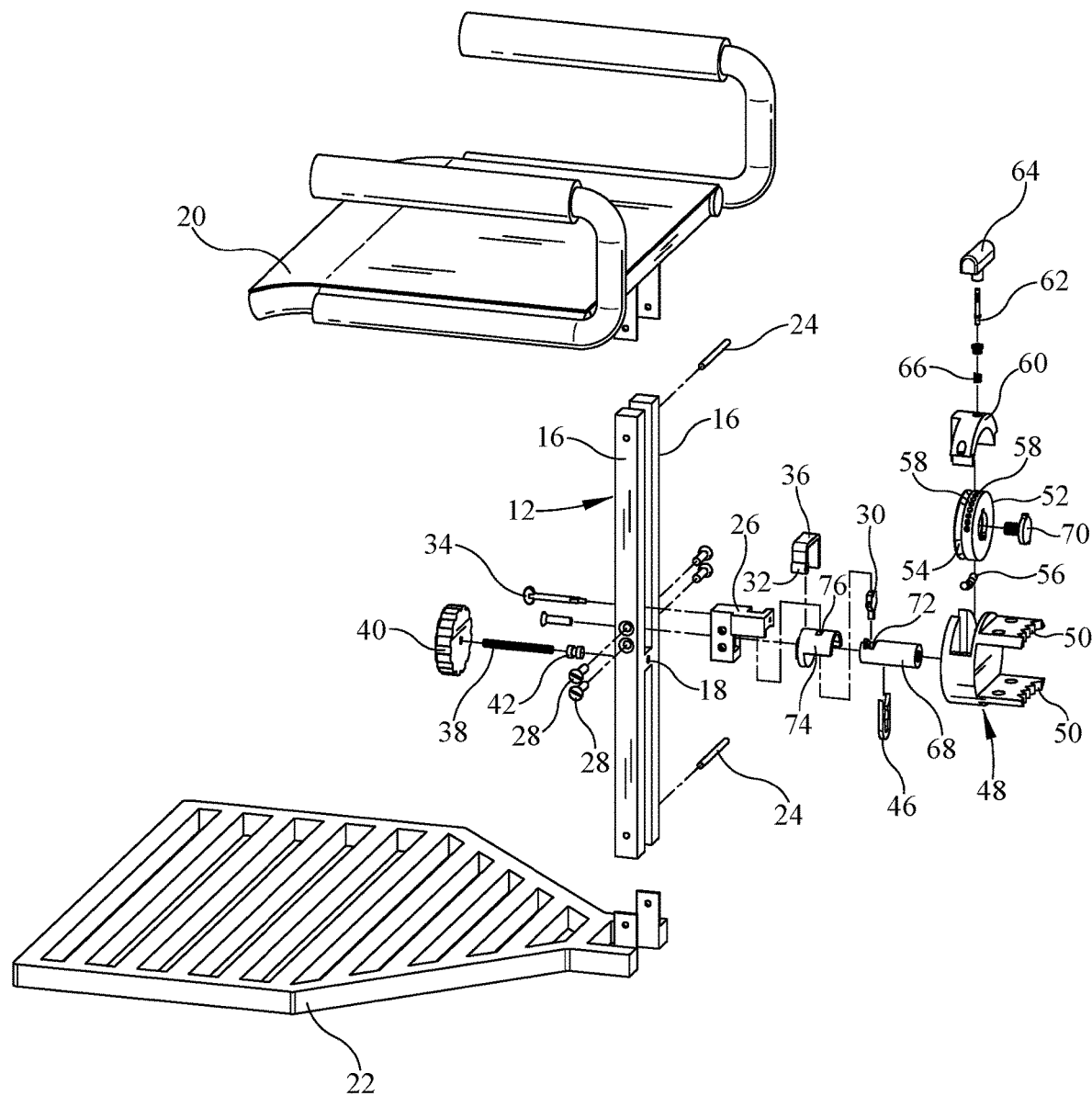
FIG. 6 is an exploded view of the adjustable tree stand.

A rotation extension 68 is fixedly attached to the rotation wheel 52 in appropriate fashion such as via the illustrated threaded bolt 70. The rotation extension 68 protrudes through an opening in the housing 48. The rotation extension 68 has a connector opening 72 therein and also has an optional end cap 74 attached to the end of the rotation extension 68, the optional end cap 74 being part of the optional locking system. The end cap 74 also has an opening 76 to correspond to the connector opening 72 of the rotation extension 68. As best seen in FIGS. 4A and 4B, the end cap 74 creates a groove 78 with the bottom surface of the rotation extension 68. In order to use the adjustable tree stand 10 of the present invention. The rotation adjustment mechanism 14 is secured to a tree T by pressing the teeth 50 of the housing 48 into the tree T and encircling the tree T with adjustable cinch straps 80 that are attached to the housing 48 via hooks 82, the cinch straps 80 being tightened appropriately. The frame system 12 is mated to the rotation adjustment mechanism 14 by positioning the frame system 12 so that rail extension 26 sits atop the rotation extension 68 and end cap 74 so that the connector pin 30 of the rail extension 26 is received within the pin opening 72 of the rotation extension 68. The connector pin 30 sits sufficiently deep within the pin opening 72 to form a firm lock between the frame system 12 and the rotation adjustment mechanism 14 and also allows the frame system 12 to pitch back and forth to some extent with respect to the rotation adjustment mechanism 14. The key 34 is inserted into the tumbler 32 and is rotated thereby rotating the latch 36. As seen, in FIG. 4B, once the latch 36 is fully rotated, a portion of the latch 36 is received within the groove created by the end cap 74 and the rotation extension 68. This prevents the connector pin from being able to be withdrawn from the pin opening 72 and thus locks the frame system 12 to the rotation extension mechanism 14. In order to adjust the roll of the frame system 12. The lock pin 62 of the locking mechanism is grasped via its handle 64 and pulled upon in order to withdraw the lock pin 62 from the pin opening 58 within which it is seated thereby freeing the rotation wheel 52 to rotate. The frame system 12 is rotated as desired until it is to the desired adjustment at which point the handle 64 is released allowing the spring-loaded lock pin 62 to once again seat within one of the pin openings 58 on the rotation wheel 52, of course, the frame system 12 may need to be further rotated slightly to get such seating. The rotation wheel 52 is once again locked and prevented from rotation so that the frame system 12 is likewise prevented from rotating and is locked in its desired position.

If the pitch of the frame system 12 needs to be adjusted, the rotation knob 40 is used to rotate and advance the threaded bolt 38 so that the end cap 42 presses on the bottom of the housing 48 causing the frame system 12 to pivot with respect to the rotation adjustment mechanism 14. Alternately, the rotation knob 40 is counter-rotated to retard the threaded bolt 38 so that the frame system 12 pivots with respect to the rotation adjustment mechanism 14 under the force of gravity. The adjustable tree stand 10 is now ready for use.

While the invention has been particularly shown and described with reference to an embodiment thereof, it will be appreciated by those skilled in the art that various changes in form and detail may be made without departing from the spirit and scope of the invention.

I claim:

1. An adjustable tree stand comprising:
   a frame having a first end and a second end, the frame also having a first extension, the first extension having a downwardly directed connector pin;
   a housing having a rotation wheel rotatably disposed therein, the rotation wheel having a second extension extending outwardly from the housing such that the second extension rotates in lock-step with rotation of the rotation wheel, the second extension having an upwardly facing connector opening, such that the connector pin is removably received within the connector opening so that whenever the connector pin is within the connector opening, the frame and the housing are locked to one another and whenever the connector pin is not within the connector opening, the frame and the housing are free to separate from one another, the rotation wheel having an outer circumference;

a tumbler having a keyhole opening and a latch, the tumbler rotatably connected to the frame such that the tumbler is rotatable between a first locked position wherein the latch is positioned overtop the connector pin that is seated within the connector opening, thereby preventing the connector pin from being removed from the connector opening, and a first unlocked position wherein the connector pin is removable from the connector opening, the tumbler rotatable via a key received within the keyhole opening, the key being removably receivable within the keyhole opening; and wherein the frame is adapted to be secured to a trunk of a tree and the frame is positioned so that the first extension is seated atop the second extension and so that rotation of the rotation wheel causes rotation of the frame.

2. The adjustable tree stand as in claim 1 further comprising a locking mechanism attached to the housing such that the locking mechanism articulates between a second unlocked position wherein the rotation wheel is free to rotate within the housing and a second locked position wherein the rotation wheel is prevented from rotating within the housing.

3. The adjustable tree stand as in claim 1 further comprising:

a pin opening disposed on the outer circumference of the rotation wheel; and a lock pin passing through the housing such that when the lock pin is received within the pin opening on the rotation wheel, the rotation wheel is prevented from rotating within the housing.

4. The adjustable tree stand as in claim 3 wherein the lock pin is spring-loaded.

5. The adjustable tree stand as in claim 1 wherein the frame has a series of teeth extending from a back thereof, the teeth adapted to dig into the tree when the frame is secured to the trunk.

6. The adjustable tree stand as in claim 1 further comprising a first platform attached to the first end of the frame.

7. The adjustable tree stand as in claim 6 wherein the first platform is a standing pad.

8. The adjustable tree stand as in claim 6 wherein the first platform is a seat.

9. The adjustable tree stand as in claim 6 further comprising a second platform attached to the second end of the frame such that the first platform is a seat and the second platform is a standing pad.

10. An adjustable tree stand comprising:

a frame having a first end and a second end, the frame also having a first extension, the first extension having a downwardly directed connector pin;

a housing having a rotation wheel rotatably disposed therein, the rotation wheel having a second extension extending outwardly from the housing such that the second extension rotates in lock-step with rotation of the rotation wheel, the second extension having an upwardly facing connector opening, such that the connector pin is removably received within the connector opening so that whenever the connector pin is within the connector opening, the frame and the housing are locked to one another and whenever the connector pin is not within the connector opening, the frame and the housing are free to separate from one another, the rotation wheel having an outer circumference;

a tumbler having a keyhole opening and a latch, the tumbler rotatably connected to the frame such that the tumbler is rotatable between a first locked position wherein the latch is positioned overtop the connector pin that is seated within the connector opening, thereby preventing the connector pin from being removed from the connector opening, and a first unlocked position wherein the connector pin is removable from the connector opening, the tumbler rotatable via a key received within the keyhole opening, the key being removably receivable within the keyhole opening;

a threaded bolt passing through frame; and wherein the frame is adapted to be secured to a trunk of a tree and the frame is positioned so that the first extension is seated atop the second extension and so that rotation of the rotation wheel causes rotation of the frame and such that the frame pivots with respect to the housing so that rotation of the threaded bolt abuts against a bottom of the housing causing such pivot.

11. The adjustable tree stand as in claim 10 further comprising a locking mechanism attached to the housing such that the locking mechanism articulates between a second unlocked position wherein the rotation wheel is free to rotate within the housing and a second locked position wherein the rotation wheel is prevented from rotating within the housing.

12. The adjustable tree stand as in claim 10 further comprising:

a pin opening disposed on the outer circumference of the rotation wheel; and a lock pin passing through the housing such that when the lock pin is received within the pin opening on the rotation wheel, the rotation wheel is prevented from rotating within the housing.

13. The adjustable tree stand as in claim 12 wherein the lock pin is spring-loaded.

14. The adjustable tree stand as in claim 10 wherein the frame has a series of teeth extending from a back thereof, the teeth adapted to dig into the tree when the frame is secured to the trunk.

15. The adjustable tree stand as in claim 10 further comprising a first platform attached to the first end of the frame.

16. The adjustable tree stand as in claim 15 wherein the first platform is a standing pad.

17. The adjustable tree stand as in claim 15 wherein the first platform is a seat.

18. The adjustable tree stand as in claim 15 further comprising a second platform attached to the second end of the frame such that the first platform is a seat and the second platform is a standing pad.

* * * * *